Figure 1:
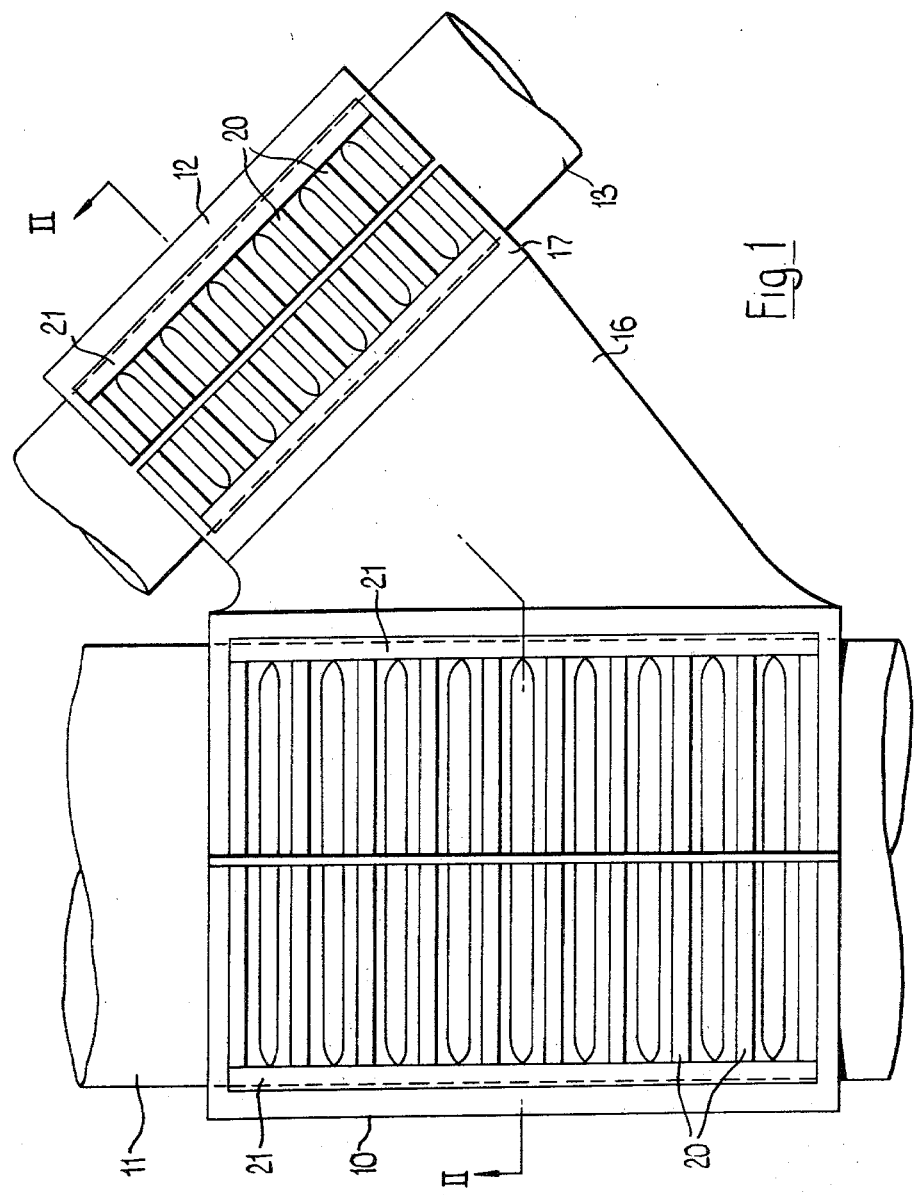

United States Patent [19]

Clark

[11] 4,300,852
[45] Nov. 17, 1981

[54] UNDERWATER STRUCTURAL JOINTS

[75] Inventor: Peter J. Clark, Purley, England

[73] Assignee: The Secretary of State for Energy in Her Britannic Majesty's Government of the United Kingdom of Great Britain and Northern Ireland, London, England

[21] Appl. No.: 41,428

[22] Filed: May 22, 1979

[30] Foreign Application Priority Data

May 23, 1978 [GB] United Kingdom ............... 21703/78

[51] Int. Cl.³ .............................................. B25G 3/36
[52] U.S. Cl. .................................... 403/385; 403/403
[58] Field of Search ................ 403/191; 403/403, 205, 403/180, 181, 182, 188, 189, 190, 191, 385, 389, 266, 267

[56] References Cited

U.S. PATENT DOCUMENTS 1,642,981  9/1927  Weiss et al. .......................... 403/180
1,835,338 12/1931  Rossman ............................. 403/385
3,299,840 11/1967  Schultz ........................... 403/267 X

FOREIGN PATENT DOCUMENTS 617722  11/1926  France ............................... 403/191
24574   of 1912  United Kingdom ................ 403/191
2006380  2/1979  United Kingdom .

Primary Examiner—Andrew V. Kundrat
Attorney, Agent, or Firm—Cushman, Darby & Cushman

[57] ABSTRACT

The invention concerns structural joints for the underwater repair of tubular members and comprises first and second connection members which extend towards each other in over-lapping/interleaving relationship, the connection member being securable to the tubular members by resin or friction clamp means and the overlapping/interleaving fingerplates being securable together by suitable resin or alternatively by resin and mechanical fastening means such as friction bolting.

8 Claims, 4 Drawing Figures

UNDERWATER STRUCTURAL JOINTS

This invention relates to underwater structural joints and in particular, but not exclusively, to joints for the underwater repair of off-shore installations.

There is a history of damage requiring repair to the structures of steel off-shore installations. Such damage may occur by overloading during installation, by a subsequent accident such as boat collision or the dropping of a heavy object or by fatigue or corrosion. The damage frequently involves the replacement or strengthening of the existing connection of one tubular member to another, and in some cases the connection of a new secondary member to an existing member may be necessary.

According to the present invention a joint between first and second tubular members comprises first and second connection members securable respectively to the first and second tubular members, each connection member including at least one outwardly extending finger plate arranged to overlap and be secured to at least one corresponding finger plate of the other connection member.

For convenience of assembly the connection members each comprise two half tubular members—usually half cylinders.

In a preferred arrangement at least one finger plate of one connection member is interleaved between two finger plates of the other connection member.

Preferably each connection member has two groups of finger plates, each group having one or more finger plates and being situated on opposite sides of the central common plane of the joint and the tubular members. The over-lapping/interleaving finger plates of the joint may be secured together by suitable resin or alternatively by resin and mechanical fastening means such as friction bolting.

In one embodiment of the invention the connection member is in the form of the friction clamp, the two halves being clamped around the tubular member by tension bars to induce a circumferencial stress in the tubular member. The connection member may with advantage be cut away in the region of the tension bar locations in order to minimise the eccentricity of the tension bars relative to the tubular member and the joint.

The connection member may be fitted directly onto the tubular member or alternatively may be spaced from the tubular member by a thin layer of resin to allow an additional degree of tolerance in the positioning of the joint.

In an alternative embodiment of the invention the connection member is in the form of a sleeve secured to the tubular member by means of resin introduced between the sleeve and the tubular member. The two halves of the connection member may be joined together by bolts the tension in which is largely supported by the connection member without intentional stress induced in the tubular member.

Spacers may with advantage be provided on the finger plates and the inside surfaces of the halves of the connection member to ensure and maintain a minimum thickness of resin in the assembled joint.

Figure 2:
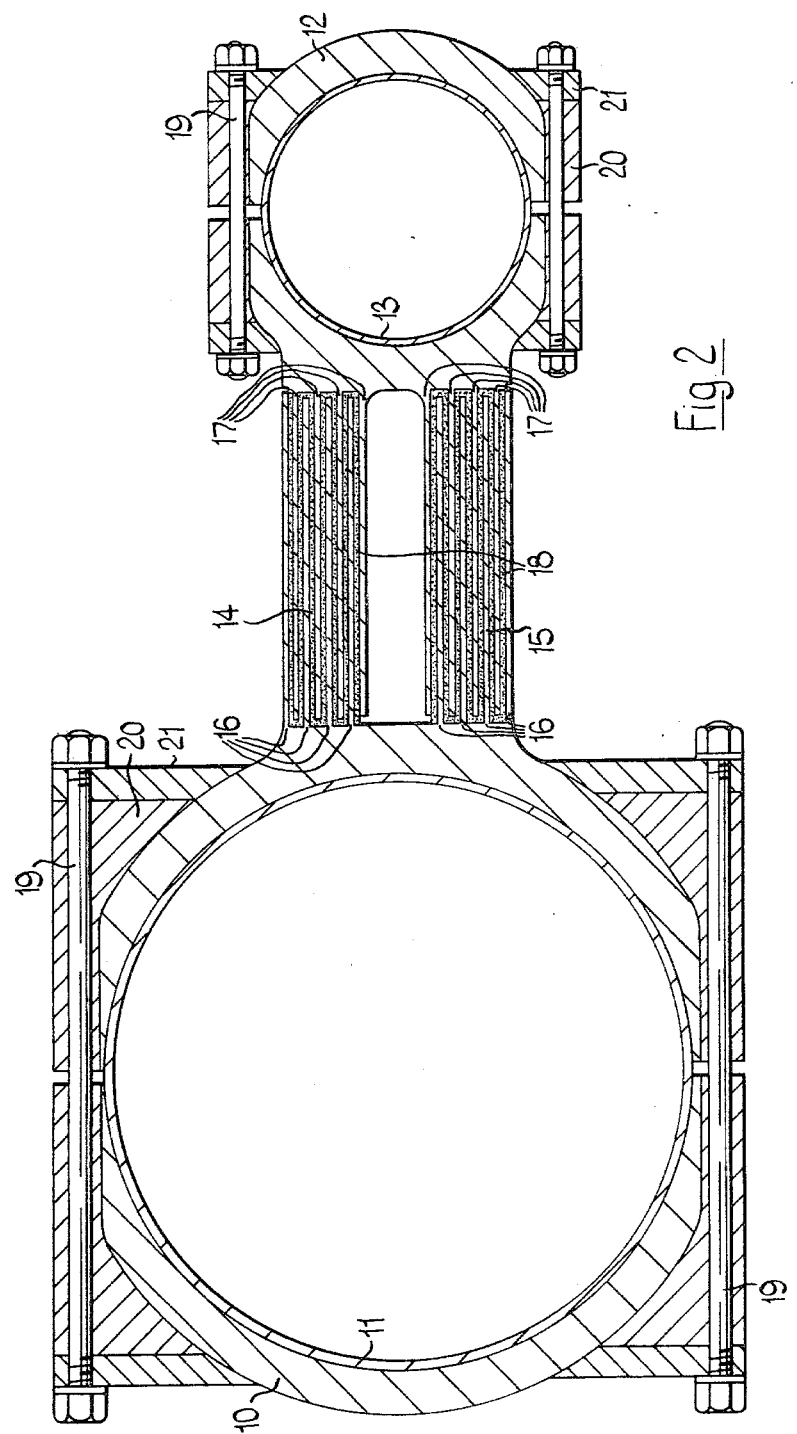
Figure 3:
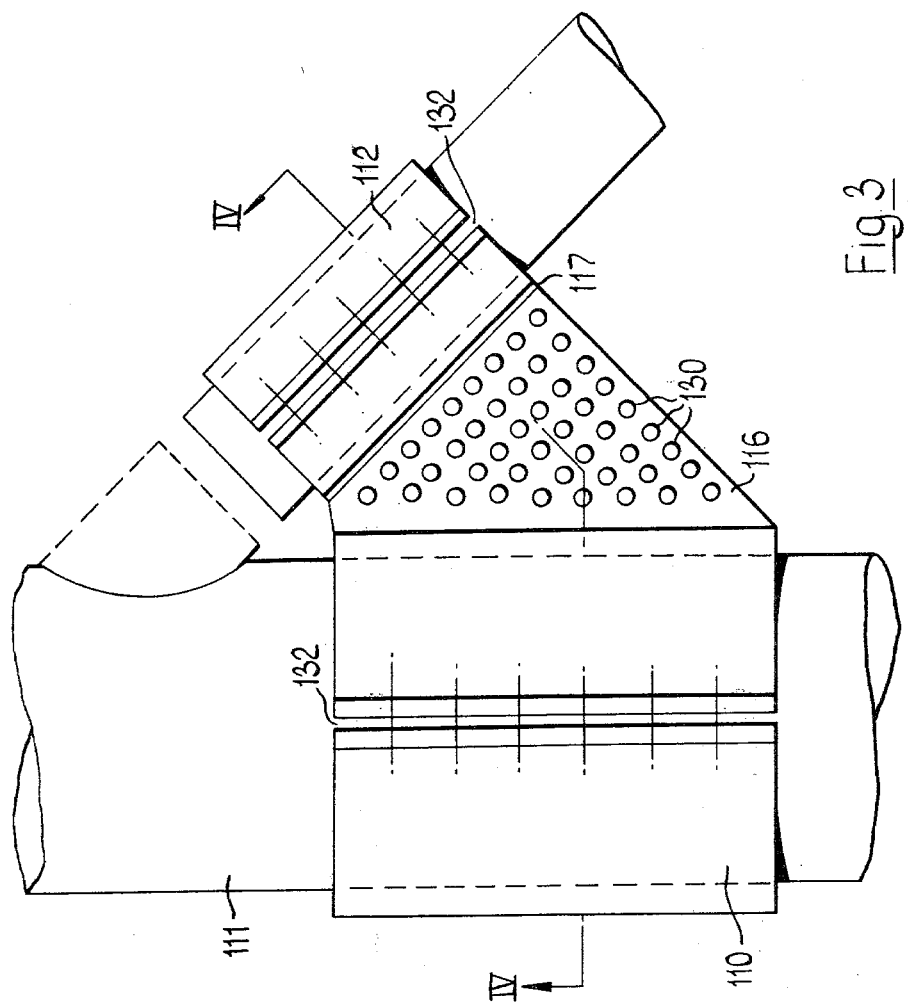
Figure 4:
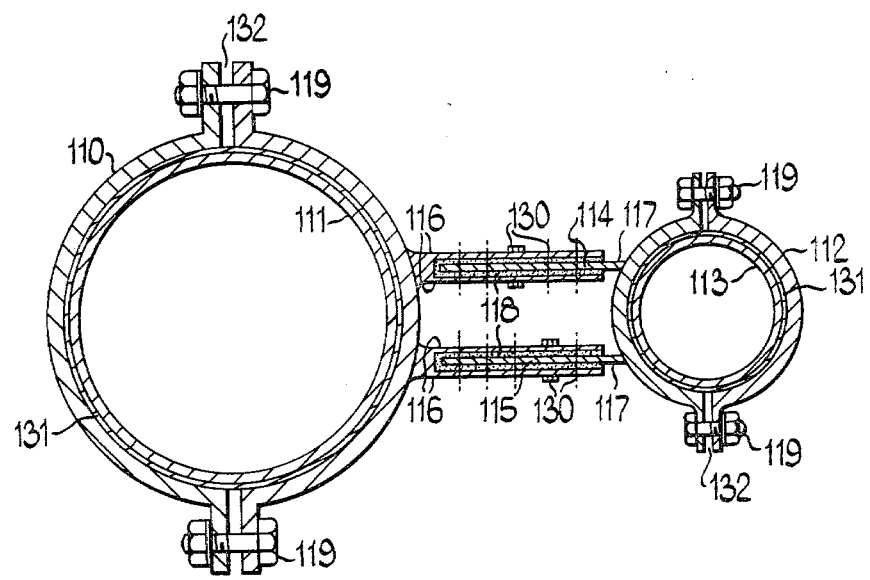

Two embodiments of the invention will now be described by way of example only with reference to the accompanying drawings in which:

FIG. 1 shows in elevation a joint of the invention incorporating friction clamp attachments, FIG. 2 is a section on lines II—II of FIG. 1, FIG. 3 shows in elevation an alternative joint of the invention incorporating resin sleeve attachments, and FIG. 4 is a section on lines IV—IV of FIG. 3.

Referring initially to FIGS. 1 and 2 the joint of the invention comprises connection members 10 and 12 secured respectively to tubular members 11 and 13 and connected to one another by means of two groups 14 and 15 of interleaving finger plates 16 and 17 secured in position by resin 18.

The connection members 10 and 12 are formed in two halves with the finger plates 16 and 17 structurally connected, or integral, with one half. As shown the connection members 10 and 12 each have four finger plates 16 and 17 in each group 14 and 15 ie a total of eight finger plates 16 and 17 per connection member 10 and 12. The gaps between the interleaved finger plates 16 and 17 (typically 5-10 mm) are filled after assembly with resin 18 and the structural connection between the finger plates is provided by the bond shear of the resin to the finger plates and the internal strength of the resin.

The connection members 10 and 12 are secured to the tubular members 11 and 13 by means of friction clamping. The two halves of each connection member 10 and 12 are clamped together around the tubular members 11 and 13 by tensioned bars 19 (see FIG. 2); the halves of the connection members 10 and 12 may be fitted directly on to the tubular members 11 and 13, or may be spaced from the tubular members 11 and 13 by a thin layer of resin. The latter is to allow an additional degree of tolerance in the setting of the joint. Axial, shear and bending movement forces to be transferred between the connection members 10 and 12 and the tubular members 11 and 13 are transmitted by a combination of friction and variation in the interface compression. The length of the connection members 10 and 12 will generally be determined by the circumferencial stress in the tube caused by the application of tension to the tensioning bars 19.

The cylindrical part of the connection members 10 and 12 is cut away at the tension bar 19 locations in order to minimise the eccentricity of the tension bars 19 relative to the tubular members 11 and 13 and the joint. Stiffeners 20 are provided on either side of the tension bar 19 locations together with a continuous bearing plate 21 against which the nuts associated with the tension bars 19 are tightened.

Referring now to FIGS. 3 and 4 there is shown an alternative joint design. Connection members 110 and 112 are secured to tubular members 111 and 113 and are connected together by means of two groups 114 and 115 of finger plates 116 and 117 secured together by friction bolts 130. Each connection member 110 and 112 is formed in two halves with the finger plates 116 and 117 structurally connected, or integral, with one half. As shown the connection member 110 has two finger plates 116 in each group 114 and 115 whilst the connection member 112 has a single finger plate 17 in each group 114 and 115. The gaps between the interleaved finger plates 116 and 117 are filled after assembly with resin 118 before tightening of the friction bolts 130 and the structural connection between the finger plates is primarily sustained by the friction on the resin/finger plate interfaces effected by the precompression of the friction bolts 130.

The connection members 110 and 112 are secured to the tubular members 111 and 113 by means of resin 131 introduced between the inside surfaces of the connection members 110 and 112 and the tubular members 111 and 113. The two halves of each connection member 110 and 112 are clamped together around the tubular members 111 and 113 by bolts 119 (see FIG. 4) although, unlike the friction clamping arrangement of the first embodiment (FIGS. 1 and 2), the bolt 119 tension will be largely supported by the connection members 110 and 112 and not by the tubular members 111 and 113. The bolted faces on the two halves of the connection members 110 and 112 are separated by a gasket 132 which permits the connection members 110 and 112 to be finally tightened after the introduction of the resin 131. The forces transmitted between the connection members 110 and 112 and the tubular members 111 and 113 will be transferred by the bond shear and compression on the resin 131 interfaces of both the connection members 110 and 112 and the tubular members 111 and 113 and by the internal strength of the resin 131.

To maintain a minimum required thickness of the resin layer 18 (FIG. 2) and 118 (FIG. 4), a pattern of small protrusions, which might be provided by weld material, may be added to the finger plates 16, 17 and 116, 117 to act as spacers. Spacers may similarly be added to the internal surfaces of the connection members, 10, 12 and 110, 112 where these are to be used in conjunction with a resin layer.

It is to be fully understood that the friction clamping arrangement of the connection members 10 and 12 (FIGS. 1 and 2) and the resin sleeve arrangements of the connection members 110 and 112 (FIGS. 3 and 4) are fully interchangeable and that for example the friction clamping arrangement of FIGS. 1 and 2 can be employed with the finger plate 116, 117 arrangement of FIGS. 3 and 4 and the resin sleeve arrangement of FIGS. 3 and 4 can be employed with the finger plate 16 and 17 arrangement of FIGS. 1 and 2.

In the joint arrangements described the finger plates 16, 17 and 116, 117 are shown connected to one half only of the connection members 10, 12 and 110, 112. When more than two tubular members are to be connected together additional finger plates may be attached to the other half of the connection members; in fact it could be deemed advisable to have finger plates on both halves of the connection members even when only one set is required for the current joint. This would provide an attachment for a subsequent repair of an adjacent member should this be necessary.

An important aspect of the interleaving finger plate connection of the invention, particularly in repair situations, is its ability to accept any geometric imperfections of the original structure. Before the introduction of the resin into the gaps the finger plates are comparatively flexible and can be moved in relation to each other. The connection members will be positioned on the tubular members before the resin is injected and the finger plates will thus be able to locate relative to each other before the structural connection is made and final lateral stiffness developed.

To further reduce the amount of work to be executed under unfavourable conditions, the finger plates of one half connection member can be interleaved with those of the other half connection member above water. In the case of the design described relative to FIGS. 3 and 4 the finger plate friction bolts would also be inserted, but not tightened, at this stage.

Although the joints of the invention are in no way limited by the type of resin employed a preferred formulation of underwater resin adhesive is disclosed in copending application No 47114/77.

It will be readily appreciated that there are many variations possible on the designs described which embody the principle of the invention.

I claim:

1. A joint for joining first and second tubular members in a noncoaxial relation, comprising first and second connection members securable respectively to the first and second tubular members to define a central common plane through the joint and the first and second tubular members, each connection member including two spaced apart arrangements of fingerplates extending laterally of its respective tubular member, the arrangements being situated on opposite sides of and substantially parallel with the central common plane, each arrangement of one of the connection members being adapted to co-operate with a respective arrangement of the other connection member to form a respective connection between the said tubular members.

2. A joint as claimed in claim 1 in which the connection member is in the form of a friction clamp, having two halves clamped around the tubular member by tension bars to induce a circumferential stress in the tubular member.

3. A joint as claimed in claim 1 in which the connection member is in the form of a sleeve secured to the tubular member by means of resin introduced between the sleeve and the tubular member.

4. A joint as claimed in claim 1 in which spacer means are provided on the inside surface of the sleeve to ensure and maintain a minimum thickness of resin in the assembled joint.

5. A joint as claimed in claim 1 in which the over-lapping/interleaving finger plates of the joint are secured by resin and mechanical fastening means such as friction bolting.

6. A joint as claimed in claim 1, wherein each said connection comprises at least three interleaved fingerplates.

7. A joint as claimed in claim 1 in which the over-lapping/interleaving finger plates of the joint are secured together by suitable resin.

8. A joint as claimed in claim 7 in which spacer means are provided on the finger plates of the connection members to ensure and maintain a minimum thickness of resin in the assembled joint.

* * * * *

UNITED STATES PATENT AND TRADEMARK OFFICE
CERTIFICATE OF CORRECTION

PATENT NO. : 4,300,852
DATED : November 17, 1981
INVENTOR(S) : CLARK

It is certified that error appears in the above—identified patent and that said Letters Patent is hereby corrected as shown below:

Column 1, line 42, delete "circumferencial" and insert --circumferential--.

Column 2, line 35, delete "movement" and insert --moment--.

Signed and Sealed this

Twenty-fourth Day of August 1982

[SEAL]

Attest:

Attesting Officer

GERALD J. MOSSINGHOFF

Commissioner of Patents and Trademarks